United States Patent [19]
Bolson

[11] Patent Number: 4,766,673
[45] Date of Patent: Aug. 30, 1988

[54] TAPE MEASURE SYSTEM

[76] Inventor: Steven J. Bolson, 18827 Siesta Dr., Penn Valley, Calif. 95945

[21] Appl. No.: 71,214

[22] Filed: Jul. 8, 1987

[51] Int. Cl.$^4$ .............................................. G01B 3/10
[52] U.S. Cl. ...................................................... 33/138
[58] Field of Search ................... 33/138, 668; 30/456, 30/451, 453; 7/163

[56] References Cited

U.S. PATENT DOCUMENTS

| 11,195 | 9/1891 | Carpenter | 30/456 |
| 1,077,778 | 11/1913 | Wolf | 30/456 X |
| 1,906,371 | 5/1933 | Dreifuss | 33/430 |

FOREIGN PATENT DOCUMENTS

| 725,934 | 1/1966 | Canada | 33/138 |
| 3415317 | 10/1985 | Fed. Rep. of Germany | 33/138 |
| 1547479 | 10/1968 | France | 33/138 |
| 10418 | of 1885 | United Kingdom | 33/138 |
| 1534971 | 12/1978 | United Kingdom | 33/138 R |

Primary Examiner—Harry N. Haroian
Attorney, Agent, or Firm—Burns, Doane, Swecker & Mathis

[57] ABSTRACT

A multifunction combination tape measuring device includes a housing and a tape reel rotatably received in the housing and wound thereon with a flexible tape. The device is characterized by the housing being formed integrally into various functional components such as a sharpener and a draw knife for sharpening pencil, a holder for retaining pen or pencil therein and a shallow groove for retaining memo pads thereon and with a hard-copy writing surface made of suitable material such as P.V.C. and mounted thereon to provide a reusable reserve writing surface. Pencil shavings collecting compartments are provided having exits for disposal of shavings. By such an arrangement of the invention it allows the use of tape measure in a most convenient and effective way for a user at any job site.

8 Claims, 3 Drawing Sheets

TAPE MEASURE SYSTEM

BACKGROUND OF THE INVENTION

The invention pertains to a multifunction tape measure and more particularly, to a tape measuring system contained in a device having two pencil sharpening means, a pencil holder and a memo note pad retainer that are integrally formed as parts of the housing and thereof allowing convenient use of the tape measure.

A conventional tape measure is being used for the tating of measurements for whatever reason or application such as iron works, building trades, indoor decorations, carpentry and furniture design and so on.

When used to take on-the-spot measurements, it is generally necessary to mark down the measurement onto a slip of paper for reference and future use before said measurement is forgotten. Therefore, while working at a job site the worker (measurer) needs to equip himself not only with a tape measure but also writing implements such as paper, pencil and pencil sharpener. Since these tools are odd pieces not integrated with tape measures, it is most often the case that these implements shall be easily misplaced or otherwise forgotten and therefore not readily convenient for use. Often at times a worker (measurer) will, when unable to locate and therefore use these convenient and correct implements, use a substitute that very often is not sufficient or is illegible to the extent that the worker must remeasure that which he has already done to be sure of said measurement(s). Having to do so creates an unnecessary expenditure of time and therefore money, energy and may even deteriorate the worker's attitude thus causing the worker to perhaps become careless.

SUMMARY OF THE INVENTION

In view of such inconveniences and difficulties frequently encountered by an artisan or other persons requiring the taking of measurements on or off the job site, the invention has provided an important object to a multifunction tape measure system having in and of itself the usual functions of a tape measuring apparatus as well as the additional utilities of 1. two pencil sharpeners, one for common pencils and the other for square type or carpenters pencils,
2. a memo pad retainer using paper and P.V.C. or "hard-copy" note pad and
3. a pencil holder that retains the pencil to the tape measure for ready convenient use.

It is the purpose of this invention to accommodate the use of all these implements into one convenient package as it is believed that each of these implements is commonly required in relationship with the use of tape measures and the taking of measurements.

Another object of the present invention is to provide a multifunction tape measure system whereby the design does not alter nor hinder the fitting nor the use of the original measuring tape, but offers new and additional functions where the various additional parts are integrally and inseperably formed with the casing whereby once the measuring tape is appropriately disposed, the additional fittings shall be ready and complete and which require no separate storage or placement and have no likelihood of getting misplaced or otherwise lost, and thus providing very convenient and economical use.

It is yet another object of the present invention to provide a multifunction tape measure system having thereon at least one or two internally integrated or mounted pencil sharpening means, a more than one or two pencil/pen holding parts or memo pad retaining parts in addition to the measuring tape mechanism.

It is a further object of the invention to provide a multifunction tape measure system in which the carpenters or square type pencil sharpening means is provided with a movable safety lid or cover capable of safety guarding against the otherwise exposed sharp cutting knife edge.

Other objects and attendant advantages of the invention shall become evident and more readily apparent and understood from the following detailed specification and accompanying drawings in which.

DESCRIPTION OF THE PREFERRED EMBODIMENTS

Figure 1:
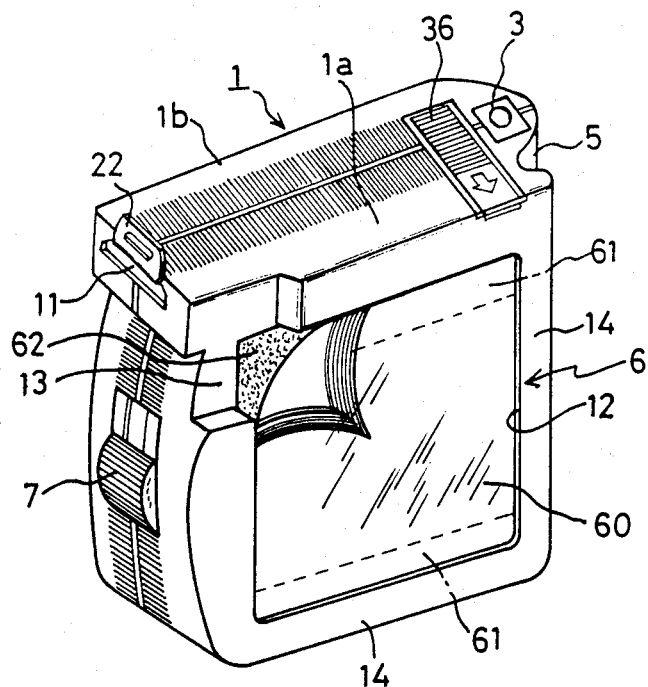
FIG. 1 is a perspective view of a multifunction tape measuring apparatus constructed in accordance with the invention in the inverted position.
Figure 2:
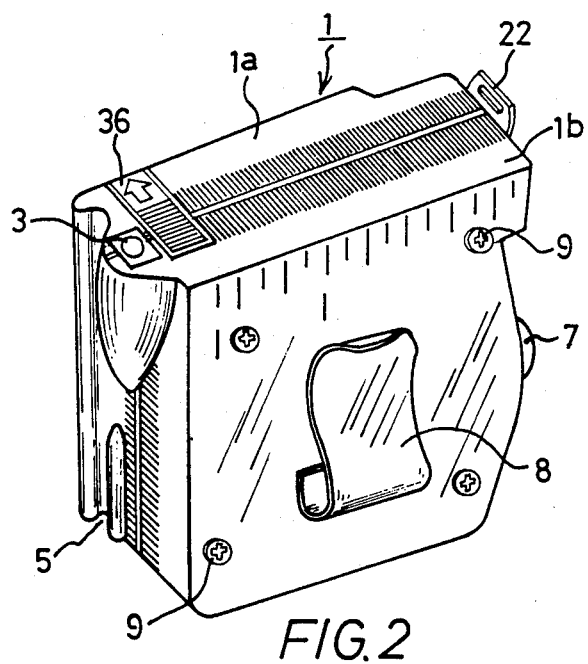
FIG. 2 is a perspective view seen from the rear face of the tape measuring apparatus shown in FIG. 1.
Figure 3:
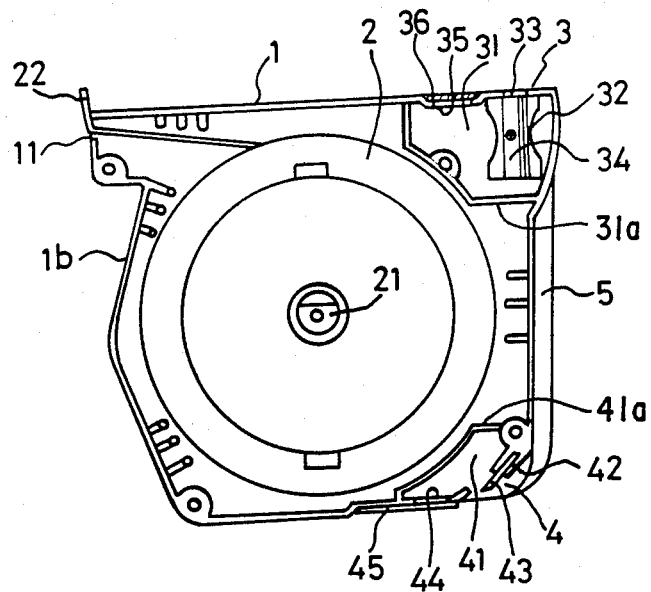
FIG. 3 is a plan view showing the internal construction of the tape measuring apparatus after the removal of a half shell body and the measuring tape control switch.
Figure 4:
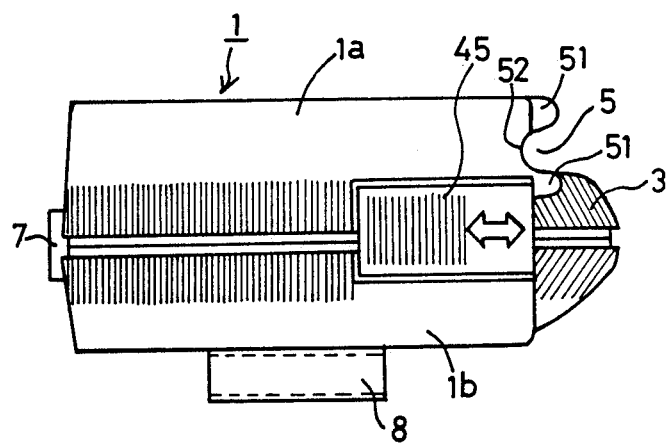
FIG. 4 is a top view of the tape measuring apparatus.
Figure 5:
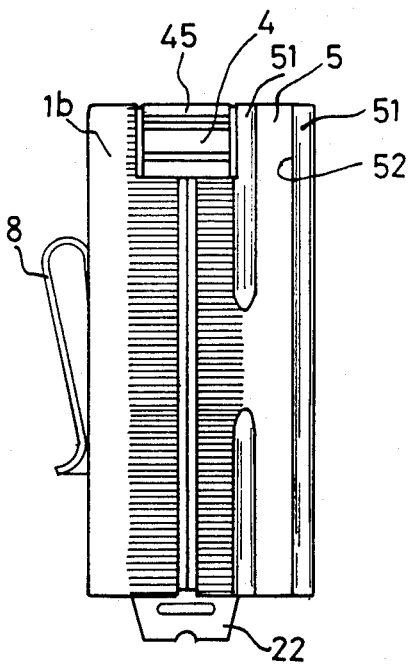
FIG. 5 is a view seen from the left side of the tape measuring apparatus.

With reference now to the drawings and particularly FIGS. 1-3, the tape measuring apparatus of the present invention is comprised of a plastics-fabricated housing 1 formed after the right and left half members 1a and 1b have been placed one against the other and fastened together by screws 9 or other means, a tape reel 2 with the center being rotatable by a rotary shaft 21 and received in the housing 1 and the circumferential face wound up with a flexible measuring tape 22, a pencil sharpening means 3 mounted in a corner portion on one side face of the housing 1, a pencil trimming (draw knife) means 4 mounted in another corner portion of the housing 1 and intended to trim the square type pencil lead for use in carpentry, a snap-in pencil holding part 5 located at another lateral side of the housing 1, memo pads retaining part 6 located at the front face of the housing 1, a tape control switch 7 mounted on one side face of the housing 1 and a belt clip 8 disposed on the rear side of the housing 1.

The above said reel 2 with tape 22 wound around is rotatably accommodated in the housing 1 in the usual way and the free end of the tape 22 where there is a bent edge is pulled out of an exit 11 of the housing 1 and is then retained at its edge. As with a conventional tape measure, the tape reel 2 is provided therein with a spring (not shown) bestowing upon the tape 22 a tendency of being selectively rewound back into the housing.

The housing 1 is as usual formed with the left and right halves 1a, 1b in combination and capable of holding in between the tape reel 2 in a sandwich manner by means of the chief inner wall in each half. However, according to the present invention, constitution of the housing 1 differs from the arrangement in the conventional tape measure. Here, in the corner portion on one side of the housing 1, for example on the side away from the tape exit 11, there is disposed a rotary pencil sharpener 3. The pencil sharpener 3 comprises a wall 31a forming a shavings collecting compartment 31 located at said corner portion of the housing 1, a sharpening member 32 securely mounted in the compartment 31 with the sharpening hole 33 open on the upper portion shown in the drawing and provided with a blade 34, a shavings outlet slit 35 provided on the top face of the housing 1 shown in the drawing and leading to the compartment 31 and a transversely slidable lid 36 openably covering the outlet slit 35. In the bottom of the housing 1 on the same side as the sharpener 3 is next mounted a pencil trimmer or draw knife 4 in a shavings collecting compartment 41 formed by a wall 41a in another corner portion of the housing 1, a blade 43 removably mounted on a supporting member 42, a shavings outlet slit 44 provided on the housing 1 and leading to the compartment 41 and a lid 45 capable of openably covering the outlet slit 44 and the edge of the blade 43 by sliding transversely.

Figure 6:
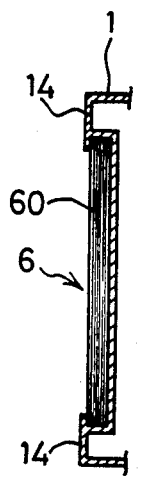
FIG. 6 is a sectional view of the major portion in another embodiment of the tape measuring apparatus depicting the memo pad retainer.
Figure 7:
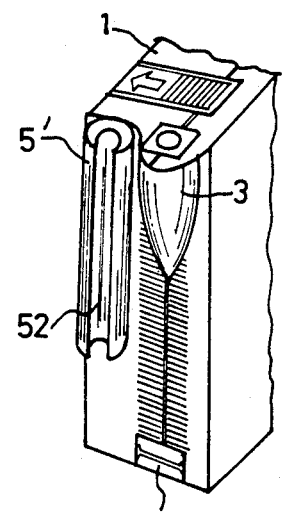
FIG. 7 is a sectional view of the major portion in still another embodiment of the tape measuring apparatus.

As is equipped in a usual tape measure, on the back of the housing 1, that is, on the front center of the left side half 1b in this example, there is mounted a resilient holding piece 8 for clipping and hanging on the leather belt, etc. On the front center of the right side half 1a there is located, however, a substantially square-shaped shallow recess or concave part 12 having at the corner part thereof where it is on the same side as the tape exit 11 formed a notch 13 communicating with said concave part 12. The concave part 12 has raised peripheral edges 14 on all sides, and by means of this shallow concave part 12, notch 13 and the raised peripheral edges 14 a memo pad retaining part 6 is constituted for accommodating and supporting thereon a pack 60 of note paper. This note paper pack 60 is coated a portion or whole portion on its back side (in the present embodiment it is on the upper and lower peripheral portions) with an adhesive 61 of temporary stickiness. However, if the peripheral edges 14 are formed in an inwardly bent L-shape, as shown in FIG. 6, to retain said note paper pack 60, use of note paper without backside adhesive 61 will be appropriate. It should also be noted that according to the invention an additional P.V.C. or other suitable material 62 may be mounted for use as a reusable hard-copy note or writing surface and that this surface shall provide itself as a convenient writing surface should the user uses up the readily available paper note pad sheets.

On the same side face of the housing 1 where the sharpener 3 is located there is formed a pen holding part 5 having high raised portions 51 on two sides and the middle formed into a cavity 5 with a dimension slightly larger than the half circle for holding in place a writing implement, such as a pencil or ball pen. In this embodiment, said pen holding part 5 is formed integrally with the housing 1, however, should there be consideration as to the problems in the manufacture of the housing 1 and the selection of materials, it is also likely that a holder 5' be separately formed of resilient plastics or rubber and having an open circular-shaped cavity 52 and next with a powerful adhesive or other suitable mounting means firmly attached to the housing 1.

Having the tape measure apparatus constructed as above, a writing implement can be ordinarily retained in the pen holding part 5 or 5' and note paper pack 60 attached to or placed in memo pad retaining part 6. On way to a job site, with the tape measure apparatus being carried along, since the other instruments such as pen, paper, etc. all together are following on the tape measure, there will be no such troubles to the user as being unable to locate the instruments all because they have been kept separately or they are getting lost or easily scattered about. Even if the instruments are not kept complete prior to going to a job site it still will be possible for the user to find out and make up the required things on the tape measure apparatus. At the same time, when in use the writing implement after it has been used to mark down things on the paper may be replaced in the holder part, which not only is convenient for ready use but shall also not cause interference to the use of the tape. Furthermore, when the pencil lead becomes broken or used up, the sharpener 3 in the tape measure apparatus may be employed for sharpening the pencil and in carpentry work or during special occasion when it is necessary to trim the pencil tip into a flat profile the pencil trimmer 4 can be readily utilized with increased convenience of use. The pencil shavings can be emptied out of the outlet slits 35 and 44 by pushing open the movable lids 36 and 45 and the cleaning is thus easy. Again, since the various pencil shavings collecting compartments 31 and 41 are completely separated from the tape accommodating compartment, the pencil shavings shall in no way enter the tape compartment. In still another instance, because normally the lid 45 is to cover over the edge of the blade 43 and only when a pencil is to be sharpened will the lid 45 be pushed open, this lid 45 also provides security. From all these efficacies which are not to be seen in a conventional tape measure, it will be most appreciable that the tape measure system of the invention is the most useful contrivance.

The foregoing is a description of the preferred embodiment of the invention and it should be understood that variations may be made thereto without departing from the true spirit of the invention as defined in the appended claims. For example, the configuration of tape measure housing or the position of pencil sharpener or trimmer is varied, or the lid is adapted into one of the openably hinged type or one of the members such as sharpener, pencil trimmer or pen holder is omitted from use or the memo pad retaining part is substituted with a holding piece like the piece 8 for retaining note paper thereon.

I claim:
1. A multifunction tape measuring device, comprising:
a housing including two housing halves joined together and forming an interior chamber therein,
a tape reel mounted in said chamber for rotation in forward and rearward directions and being spring-biased in said rearward direction,
an extensible measuring tape wound on said reel,
wall means in said housing defining a compartment within said housing, said wall means isolating said compartment from said chamber,
a pencil sharpener mounted in said compartment for receiving a pencil inserted into said compartment, shavings from said pencil being collected in said compartment,
said compartment including an outlet for discharging shavings,
a lid movably mounted on said housing for opening and closing said outlet, a holder arranged on said housing for retaining a writing implement, and a recess formed in an outer surface of said housing for retaining one or more sheets of writing material.

2. A multifunction tape measuring device according to claim 1, wherein said pencil sharpener comprises a rotary type of pencil sharpener wherein sharpening occurs in response to relative rotation between the pencil and said sharpener.

3. A multifunction tape measuring device according to claim 1, wherein said pencil sharpener comprises a draw knife.

4. A multifunction tape measuring device according to claim 2 including additional wall means in said housing for forming an additional compartment, a draw knife mounted in said additional compartment and adapted for sharpening pencils, an additional outlet for discharging shavings from said additional compartment, and an additional lid movably mounted on said housing for opening and closing said additional opening.

5. A multifunction tape measuring device according to claim 1, wherein said holder comprises a pair of parallel spaced-apart raised portions formed integrally with an exterior surface of said housing, said raised portions defining a cavity therebetween for retaining a writing implement therein.

6. A multifunction tape measuring device according to claim 1, wherein said holder comprises a separately formed member adhered to said housing, said member comprising a resilient material.

7. A multifunction tape measuring device according to claim 1, wherein said recess includes a notch along an outer periphery thereof to afford access to an edge of the sheet of writing material.

8. A multifunction tape measuring device according to claim 1, wherein said pencil sharpener comprises a rotary type of pencil sharpener wherein sharpening occurs in response to relative rotation between the pencil and said sharpener; said pencil sharpener comprising a draw knife; additional wall means provided in housing for forming an additional compartment; a draw knife mounted in said additional compartment and adapted for sharpening pencils; an additional outlet for discharging shavings from said additional compartment; and an additional lid movably mounted on said housing for opening and closing said additional opening; said holder comprising a pair of parallel spaced apart raised portions defining a cavity therebetween for retaining a writing implement; said recess including a notch along an outer periphery thereof to afford to an edge of the sheet of writing material.

* * * * *